O. W. BENSTER.
WIRE STRAIGHTENING, CRIMPING, AND CUTTING MACHINE.
APPLICATION FILED NOV. 23, 1908.
1,040,493.
Patented Oct. 8, 1912.
4 SHEETS—SHEET 2.
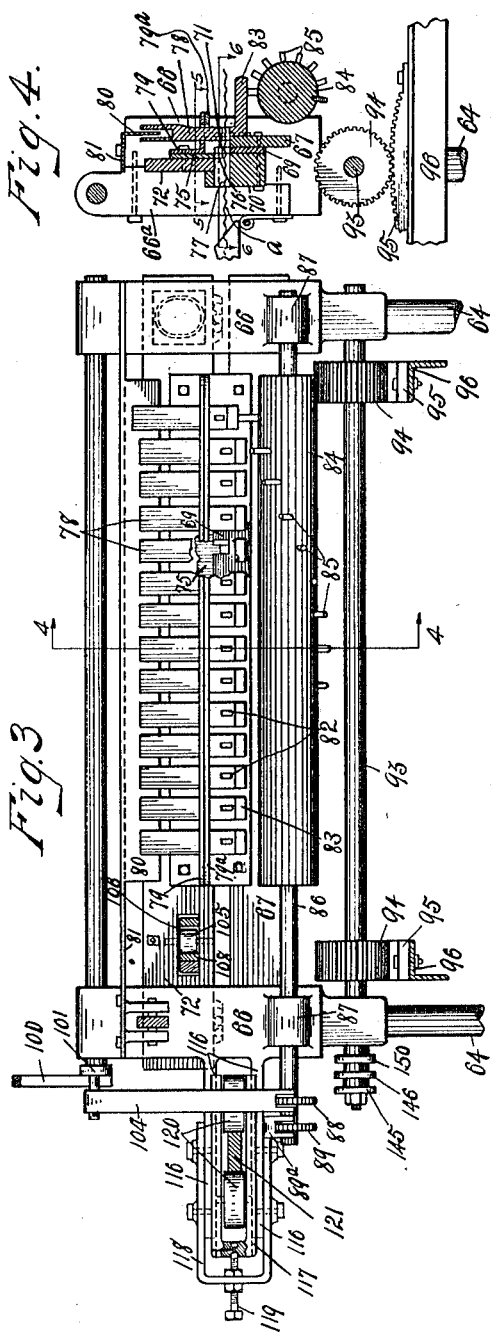
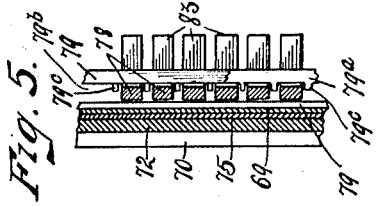
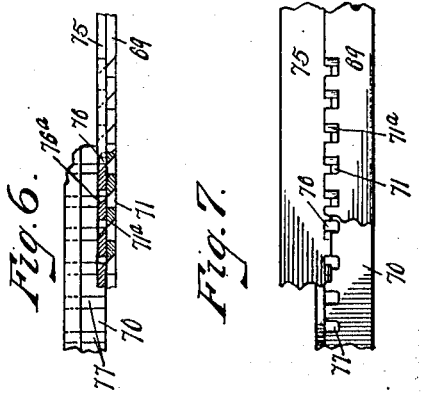
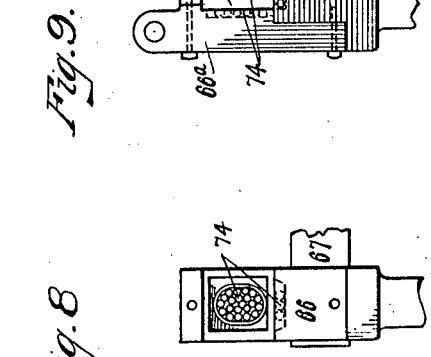
WITNESSES.
Hazel B. Hiett
INVENTOR.
Olin W. Benster,
By Owen & Owen,
His attys.

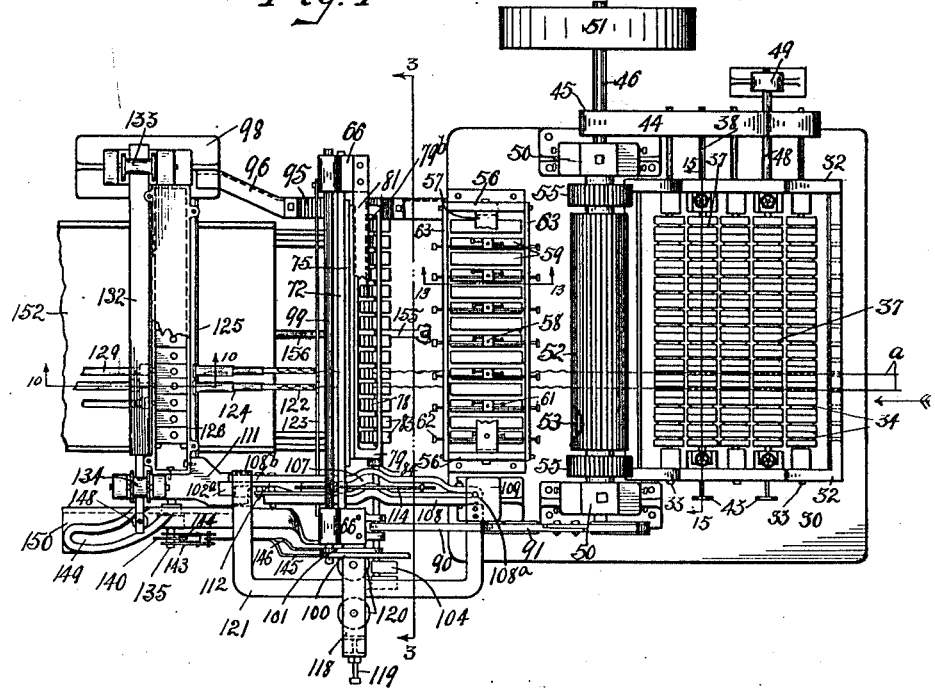

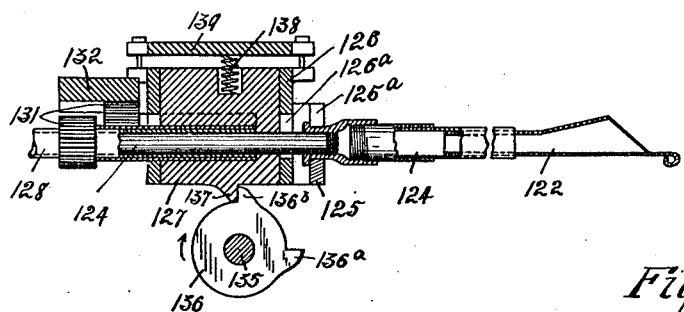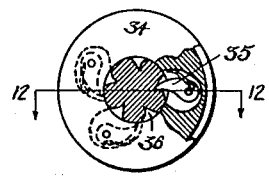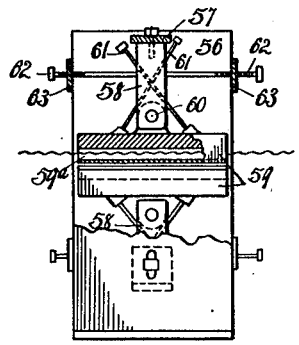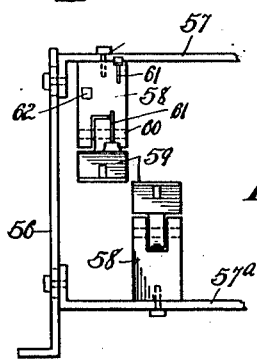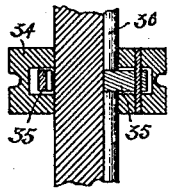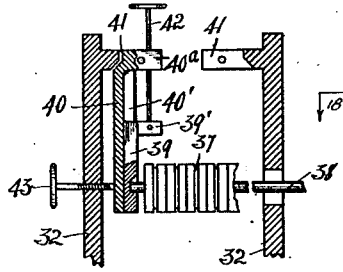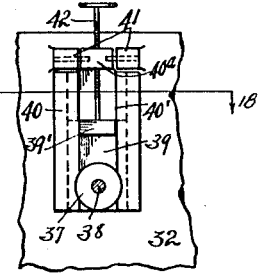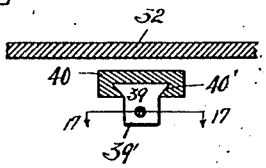

O. W. BENSTER.
WIRE STRAIGHTENING, CRIMPING, AND CUTTING MACHINE.
APPLICATION FILED NOV. 23, 1908.
1,040,493.
Patented Oct. 8, 1912.
4 SHEETS—SHEET 4.
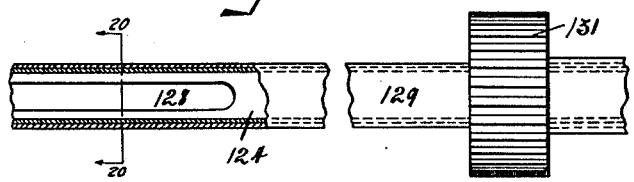
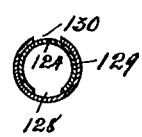
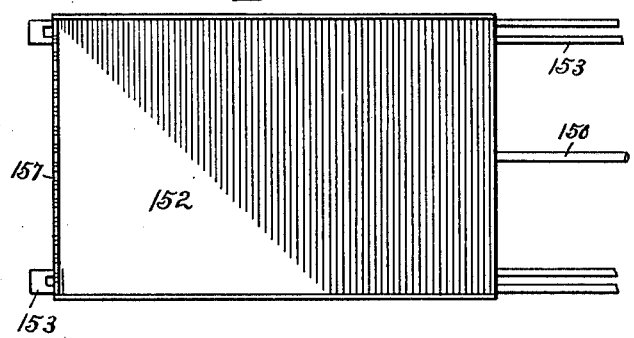
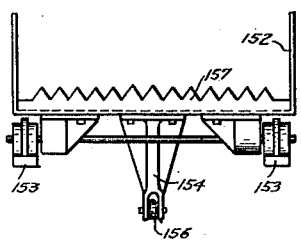
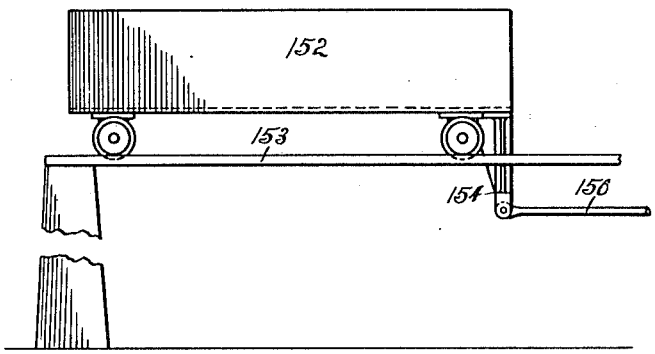
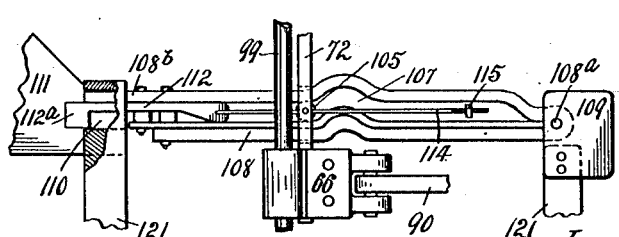
WITNESSES.
Hazel B. Hiett
INVENTOR.
Olin W. Benster
By Owen & Owen
His attys.

UNITED STATES PATENT OFFICE.

OLIN W. BENSTER, OF TOLEDO, OHIO.

WIRE STRAIGHTENING, CRIMPING, AND CUTTING MACHINE.

1,040,493.  Specification of Letters Patent.  Patented Oct. 8, 1912.

Application filed November 23, 1908. Serial No. 464,130.

*To all whom it may concern:*

Be it known that I, OLIN W. BENSTER, a citizen of the United States, and a resident of Toledo, in the county of Lucas and State of Ohio, have invented a certain new and useful Wire Straightening, Crimping, and Cutting Machine; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to wire working mechanism, and particularly to means for straightening and crimping one or more threads of wire, and then cutting the same in sections of predetermined length.

An object of my invention is the provision of a machine of this class, which is adapted to successively act on different ones of a plurality of wire threads fed thereto whereby to intermittently sever sections therefrom at predetermined periods and which is especially designed for use in connection with wire-fabric looms, or the like, into which sections of wire are intermittently fed during the weaving operation, but is not restricted to such use.

A further object of my invention is the provision, in combination with a continuously feeding wire, of a wire-cutting mechanism, the cutter parts of which are automatically actuated to move with the wire being severed during the cutting operation to prevent an interruption of the wire feed during the severing or a buckling of the wire thread should the feed thereof be continuous during such operation.

Further objects of my invention, as well as the operation, construction and arrangement of the parts of a preferred form thereof are fully described in the following specification, and illustrated in the accompanying drawings, in which—

Figure 1 is a top plan view of a machine embodying my invention, with portions thereof broken away. Fig. 2 is a side elevation thereof with portions broken away. Fig. 3 is an enlarged rear elevation of the cutting-mechanism looking forward from the line 3—3 in Fig. 1, with a portion broken away. Fig. 4 is a vertical section of the cutting mechanism on the line 4—4 in Fig. 3. Figs. 5 and 6 are partial sections on the lines 5—5 and 6—6, respectively, in Fig. 4. Fig. 7 is an enlarged rear elevation of a portion of the coöperating knives of the cutter. Figs. 8 and 9 are enlarged front and inner side elevations of the head of the right oscillatory standard of the cutting-mechanism, with the knife-holding block removed from the former. Fig. 10 is an enlarged vertical section on the line 10—10 in Fig. 1. Fig. 11 is an enlarged transverse section of one of the straightening roll shafts, with a roll partly in section thereon. Fig. 12 is a section on the line 12—12 in Fig. 11. Fig. 13 is an enlarged side elevation of the crimped-wire straightener with a portion in vertical section on the line 13—13 in Fig. 1. Fig. 14 is an enlarged rear elevation of an end portion of the crimped-wire straightener. Fig. 15 is an enlarged transverse vertical section taken in a vertical plane with the shaft of one of the upper wire-straightening rolls, as on the line 15—15 in Fig. 1, with portions broken away. Fig. 16 is an enlarged inner elevation of one of the straightening-roll adjusting parts. Fig. 17 is a section on the line 17—17 in Fig. 18. Fig. 18 is a section on the line 18—18 in Fig. 16. Fig. 19 is an enlarged plan of a portion of one of the conduits into which the several sections of wire are fed, with a portion thereof in central horizontal section. Fig. 20 is a cross-section on the line 20—20 in Fig. 19. Figs. 21, 22 and 23 are end, plan and side views, respectively, of the trough into which the several wire sections are deposited; and Fig. 24 is an enlarged plan of a portion of the knife operating mechanism.

Referring to the drawings, 30 designates a table or horizontal portion of the machine frame, which is supported by legs 31 and has the uprights or frame sides 32, 32 rising therefrom in transversely spaced relation, in which the ends of a set of lower feed and straightening-roll shafts 33 are suitably journaled. Mounted on each of these shafts are a plurality of peripherally grooved rolls 34, each of which preferably carries one or more internal pawls 35 adapted to engage notches 36 in the roll-shaft, as shown in Figs. 11 and 12, to cause the rolls to rotate with the shaft when the latter is rotated in one direction and to permit a free differential rotation of the rolls thereon in the same direction. The purpose of this is to cause a roll to be positively rotated at a predetermined speed by its shaft, and to permit such roll to rotate faster than its shaft should the feed of the coacting wire thread $a$ be quickened by any cause. An upper set of feed and straightening-rolls 37 is carried by shafts 38 intermediate the vertical planes of the shafts 33, which shafts 38 are journaled at their ends in bearing-blocks 39. These bearing-blocks have vertical adjustment in guide-ways 40' of carrying-members 40 (see Figs. 15, 16, 18), which are pivotally suspended from between lugs 41 projecting inwardly from the frame-sides 32, 32 to adapt them for swinging adjustment longitudinally of the shafts. The blocks 39 are vertically adjusted in their respective guide ways by adjusting-screws 42, which are threaded through lugs $40^a$ at the upper ends of the members 40 and have their lower ends attached to subjacent lugs 39' projecting from said blocks, as shown. The shafts 38 at one end have end-thrust bearings in the blocks 39 at such end, and the members 40 carrying these blocks are shown as having their horizontal swinging adjustment controlled by adjusting-screws 43, which are threaded through the associated frame-side 32 and have their inner ends thrust against said members in opposition to the thrusts of the shafts 38 on said blocks, see Figs. 1 and 15.

The shafts 33 and 38 project beyond the frame-side 32 opposed to the one through which the screws 43 pass, and carry belt-pulleys at such ends around which a belt 44 passes, as shown in Figs. 1 and 2. This belt is driven by a pulley 45, which is carried by the shaft 54, and also passes over an idler-pulley 47 carried by a shaft 48, which has one end journaled in the contiguous frame side 32 and its other end journaled in an outboard bearing 49, Figs. 1 and 2.

A drive-shaft 46 is journaled in pedestal-bearings 50, 50 rising from opposite side portions of the table 30 in advance of the straightening-mechanism and carries a large belt-pulley 51 at one end and a crimping-roll 52 intermediate said bearings. A coöperating crimping-roll 53 is carried below the roll 52 by a shaft 54, the ends of which are journaled in the pedestals 50. The rolls 52 and 53 are caused to rotate in unison by meshing-gears 55 carried by their shafts, see Fig. 1.

Mounted on the table 30 in advance of the crimping-rolls are the two uprights 56, 56, which are spaced transversely of the table and connected at their tops and near their bottoms by horizontal bars or strips 57, $57^a$, respectively, see Figs. 1, 2, 13 and 14. Sets of spaced arms 58 are pivoted to and project downward from the upper bar 57 and upward from the lower bar $57^a$ in alternating relation, and each carries a wire-straightening block 59 at its lower or upper end as the case may be, which block is elongated in the direction of feed of the wire threads $a$ and is provided with a longitudinal opening $59^a$ of suitable size to permit a crimped wire to freely pass therethrough, see Fig. 13. For the purpose of adapting the blocks 59 for adjustment relative to a horizontal plane as it may be necessary to take the bow out of the wire after leaving the crimper, each is pivoted to its arm 58, as at 60, and acted on by adjusting-screws 61, 61, which diagonally pass through the arm 58 and bear on the block on opposite sides of such arm, as shown. Adjusting-screws 62 are carried by strips 63, which connect the side edges of the uprights 56 to the rear of and in advance of the arms 58, and coact at their inner ends with said arms 58 at one side of their vertical axes to enable said arms to be turned on their pivots by a loosening of one screw and a tightening of the other, whereby to permit a horizontal shifting of the blocks 59, see Figs. 13 and 14.

Disposed in advance of the table 30 at either side of the machine are the two standards 64, 64, each of which is pivoted at its base to floor-brackets 65, to adapt it to have forward and backward swinging movements, and carries a head 66 at its upper end. The heads 66 are rigidly connected by a bar 67, the ends of which are suitably secured within openings 68 (Fig. 9) in said heads. This bar has the stationary knife-plate 69 and the elongated-block 70 bolted to its front side, with the knife interposed between the bar and block, as shown in Fig. 4. The knife 69 has its upper edge projected above the bar 67 and provided with notches 71 through which the wires $a$ are intended to pass, said notches each having a side wall beveled, as shown at $71^a$, Figs. 6 and 7, to provide a forward cutting-edge. The block 70 has the rear portion of its top longitudinally milled or cut-away to form a guideway in which the lower edge of the longitudinally reciprocatory bar 72 rests, see Fig. 4, the ends of which bar work through openings 73 (Fig. 9) in the heads 66, which openings are shown as carrying ball-bearings 74 (Figs. 8 and 9) in the walls thereof. A knife-plate 75 is attached to the rear face of the bar 72 and has its lower edge, which projects below said bar, in shearing engagement with the upper forward edge portion of the lower stationary knife 69 and provided with notches 76, which register with the notches 71 in said lower knife and have one wall beveled, as shown at $76^a$, Fig. 6, to form shearing edges in opposition to the shearing edges of the stationary knife. The notches 71 of the lower knife are of greater depth than the notches 76 of the upper knife to provide a clearance space in the former below the edge of the upper knife, as shown in Figs. 4 and 7, in which the wire threads passing therethrough normally lie, thus preventing a wire from being severed except when raised into the path of movement of the associated shearing edge of the upper knife. The block 70 is provided with openings 77 in register with the notches 71 of the lower knife through which the wires pass. The heads 66 are shown as having removable parts 66$^a$, see Figs. 4 and 9, which form one wall of the openings 73 through which the ends of the upper knife bar 72 work, thus enabling an adjustment of the bearings provided for such bar and also facilitating an assembling or disassembling of the parts.

Mounted in the rear of the knives 69 and 75 are a plurality of vertically-reciprocatory hammers 78, which work through longitudinal slots or openings 79$^b$ provided in horizontal guide ledges 79, 79$^a$, see Figs. 1, 4 and 5, the former of which projects from the movable knife 75, while the latter is attached to the fixed knife-bar 67. The slot in the lower ledge 79$^a$ is provided with inwardly projecting spurs 79$^c$ which space the hammers apart, as shown in Fig. 5. The hammers 78 have their upper ends forked to receive a guide-flange 80, as shown in Fig. 4, which flange projects downwardly from the strip 81 connecting the heads 66. These hammers correspond in number to the number of notches in the knives, one being disposed to the rear of each notch, and are provided with eyes 82 through which the wire threads pass. The lower end of each hammer is provided with a foot or rearward extension 83, which projects over a roll 84 in position to be engaged and raised by one of a series of pins 85 carried by said roll at each revolution of such pin with the roll. The purpose of lifting the hammers 78 is to raise their respective wires from the clearance space in the notches 71 of the lower knife up into the path of movement of the cutting edges of the upper knife to cause a severing of the wires when the upper knife is reciprocated. The pins 85 are arranged in spiral form around the roll 84, or in such manner that the hammers are lifted one at a time and in successive order from one end to the other of the roll, as is hereinafter more fully described. The roll 84 is carried by a shaft 86, the ends of which are journaled in bearings 87 in the rear sides of the heads 66, see Fig. 3, and one end of said shaft is projected beyond its bearing and carries the two ratchet-wheels 88 and 89, which are acted on by pawls, as hereinafter described.

The heads 66 and parts carried thereby, which comprise the cutting mechanism, have oscillatory movements communicated thereto by a pitman 90, which is attached at one end to one of said heads, being the left in the drawings, and carries a mangle-rack 91 at its rear end, which meshes with a stationary pinion 92 carried at the contiguous end of the crimping-roll shaft 46. In order to prevent any tendency of one side of the oscillatory parts to lag due to the attaching of the actuating means to one side only thereof, a shaft 93 has its ends journaled in the lower portions of the two heads 66 and has pinions 94 fixed thereto near either end thereof for meshing in segmental racks 95, which are mounted on arms 96 projecting forward from opposite side portions of the table 30, see Figs. 1, 2, 3 and 4. The arm 96 to the left is supported at its forward end by a leg 97 and extends upwardly therefrom and attaches to a frame-part 111, while the other arm 96 is secured at its forward end to the standard 98, see Figs. 1 and 2.

99 designates a rock-shaft, which has its ends journaled in the tops of the heads 66 and carries the two relatively angled arms 100 and 101 on the end thereof disposed adjacent the ratchet-wheels 88, 89 on the shaft 86. The arm 100 projects upwardly and rearwardly and has its free end adjustably pivoted to a link 102, which is in turn pivoted at its rear end to an arm 103 projecting upwardly from the contiguous pedestal 50, thus causing the shaft 99 to have a rocking movement communicated thereto when the cutter-frame is oscillated. The shorter arm 101 of the pair projects rearwardly in substantially a horizontal plane, and at its free end carries a pawl 104, the lower end of which engages the teeth on the ratchet-wheel 88, thus causing an impulse or intermittent movement to be imparted to the pin-roll 84 at each forward movement of the cutter parts. The ratchet-wheel 89 is engaged by a pawl 89$^a$, (Fig. 2) which is attached to a projecting portion of the contiguous head 66, said ratchet and pawl being intended to serve merely as a means for preventing a back-turning of the pin-roll 84.

The upper knife 75 and its carrying bar 72 have reciprocatory or shearing movements imparted to them at each forward movement of the cutter-parts by reason of a roller 105, which is carried by a vertical spindle within an opening 106 in the bar 72 near its left end, working in a cam-groove or slot 107 provided longitudinally of the bar 108, which also works through the opening 106 and has the contour of its sides conforming to that of the groove, as shown in Figs. 1 and 24. In order to prevent a reciprocation of the bar 72 on a rearward movement of the cutter-parts the cam-bar 108 has its rear end pivoted as at 108$^a$ to the top of a standard 109, which rises from the forward end of the table 30, as shown in Figs. 1 and 2, and has its forward end formed at one side with an extension 108$^b$, which projects into a horizontal opening 110 provided in a registering portion of a frame part 111. The opening 110 is of greater width than the extension 108ᵇ to enable said extension to have lateral horizontal movements therein. Working through the opening 110 at the outer side of said extension is a lock-finger 112 the forward end of which is formed with an abrupt outward enlargement 112ᵃ of proper width to combine with the extension to fill said opening, thus preventing lateral movement of the cam-bar when said enlargement is drawn within the opening. The finger 112 is caused to move laterally with the cam-bar but is permitted to have longitudinal movement relative thereto by reason of the rear end of the finger working in the forward end of the cam-groove or slot in the bar. The finger 112 has a rod 114 projecting rearwardly therefrom through an aperture in the knife-bar 72 and carries an adjustable nut or stop-member 115 at its rear end, see Fig. 24, which is properly adjusted to adapt it to be engaged by the knife-bar near the limit of its rearward oscillatory movement with the cutter-parts, thus causing a slight rearward movement of the rod 114 and attached finger 112 to draw the enlargement 112ᵃ into the opening 110 to lock the cam-bar against lateral movement on the return or forward stroke of the cutter-parts. When the cutter-parts are near the limit of their forward movement the bar 72 engages the rear end of the finger 112 and effects an ejectment of its enlarged end from the opening 110, thus permitting the cam-bar to have a lateral movement within the opening on the rearward stroke of the cutter-parts. With this in mind it will be apparent that the knife-bar 72 will be reciprocated or have wire-cutting movements imparted thereto only on the forward stroke of the cutter-parts, as during such movement the cam-bar 108 is held rigid by the locking engagement of the lock-finger 112 therewith so that when the roll 105 passes through the offset or cam portion of the groove 107 the knife-bar will be caused to reciprocate in its bearings, whereas on the rearward movement of the cutter-parts, the lock-finger stands in released position relative to the cam-bar and permits an oscillation of such bar as the roll follows the cam-groove therein instead of effecting a reciprocation of the knife-bar 72.

In order to brace the cutter-parts in opposition to the cutting movements of the knife-bar 72, I provide the outer side of the head 66, which is disposed adjacent the cam-bar 108, with the outwardly projecting vertically spaced arms 116, 116, which form guides between which a U-shaped yoke member 117 is mounted for longitudinal adjustment, as shown in Fig. 3. A second U-shaped member 118 has its legs embracing and secured to the outer sides of the arms 116 and at its loop-end carries an adjusting-screw 119, which is engaged at its inner end to the loop end of the adjustable yoke 117 to facilitate an adjustment thereof. Mounted on vertical spindles in horizontally spaced relation between the legs of the adjustable yoke member 117 are the rolls 120, between which a bar 121 passes in contact with both, as shown in Figs. 1 and 3. This bar is shown as having its ends projected inwardly and one rigidly secured to the top of the standard 109 and the other end secured to the frame part 111, see Fig. 1. It is thus apparent that the cutter-parts are rigidly braced transversely of the machine by the rolls 120 working against the opposite edges of the bar 121, which is in turn rigidly carried by the frame.

The wire threads $a$, after passing through the cutter-mechanism, enter registering conduits by which they are guided in their continued forward movements. Each of these conduits comprises a mouth-piece 122, which is pivoted at its rear end to a shaft 123, connecting the heads 66 of the cutter-mechanism, and has its forward end telescoping within a stationary tube 124 to adapt such end of the mouth piece to have forward and backward movements within the tube as the cutter-parts oscillate. Each tube 124 is mounted for vertical movements in a notch 125ᵃ in a bar 125 (see Fig. 10), which extends transversely of the machine and has its opposite ends attached to the standard 98 and frame-part 111. The tubes 124 extend forward from said bar through vertically disposed slots 126ᵃ in the sides of a rectangular frame 126 (Fig. 10), which is also supported at its ends by the standard 98 and frame-part 111. The frame 126 has its bottom and top open and has a plurality of blocks 127 mounted for vertical movements therein, see Figs. 1 and 10, through each of which one of the tubes 124 projects having a close fit therein. The tubes 124 are projected some distance beyond the front of the frame 126 and such extended portions are provided in their bottoms with longitudinal slots 128 (Fig. 19) to permit the wire sections to drop therefrom when severed from their threads. This forwardly projected end portion of the tube 124 is incased by a larger tube 129, which is intended to turn freely thereon, and is provided in one side thereof with a longitudinal slot 130, which may be moved into register with the slot 128 in the inner tube by a turning of the tube 129. The rear end of the tube 129 is shown in Fig. 10 as being projected within the forward portion of the associated block 127, and as carrying a pinion 131 in advance of the frame 126. This pinion, when raised with its tube by an elevation of the associated block 127 is adapted to move into mesh with a superimposed rack-bar 132, which is disposed transversely of the machine in advance of the frame 126 and has its ends working between sets of rollers 133 and 134, the former set of which is suitably carried at the upper end of the standard 98 while the latter set is carried by the frame part 111, see Figs. 1 and 2. As the tubes 129 are disposed too close together to place the pinions 131 in alinement, each alternate pinion is disposed in advance of the next pinion, as shown.

135 designates a shaft which is disposed below the frame 126 with its ends journaled in the standard 98 and frame part 111 and carries a plurality of cam-disks 136, one of which is disposed beneath each block 127. Each disk 136 is provided with two cam-projections 136$^a$, 136$^b$, which when the disk is rotated are intended to successively move into engagement with a registering lug 137 on the under side of the associated block 127 and effect an elevation of the block and the tubes carried thereby for the purpose of raising the associated pinion 131 into mesh with the rack-bar 132. While the cam projections 136$^a$, 136$^b$ are spaced the same distance apart on each of the disks for the purpose hereinafter described, the projections of the several disks are preferably differentially arranged with respect to each other, so that only one block is being elevated at a time. The blocks 127 are yieldingly held in lowered position by the action of compression-springs 138, which have their opposite end thrusts against said blocks and a plate 139, which is disposed over the top of the frame 126, see Figs. 1 and 10. A ratchet-wheel 140 is carried at one end of the shaft 135 and is acted on by pawls 141 and 142, which are respectively carried by arms 143 and 144. These arms are loosely mounted on the shaft 135 at the side of the ratchet 140, and are connected by rods or links 145 and 146, respectively, to the contiguous end of the shaft 93 carried by the heads 66. The end of the shaft 93 projects loosely through longitudinal slots 147 in said rods, see Fig. 2, thus adapting the rods to have reciprocatory movements communicated thereto from said shaft only during the last portions of the forward and backward oscillatory movements thereof. It is thus evident that the shaft 135 will have intermittent movements imparted thereto at the limits of the forward and backward movements of the cutter-parts and that the pawls 141 and 142 alternately act thereon for such purpose.

The rack-bar 132 is reciprocated at each forward and backward movement of the cutter-parts due to a roll 148 carried at one end thereof working in a cam-groove 149 provided in the surface of a bar 150, which bar has a reciprocatory movement on a ledge 151 of the frame part 111 and has its rear end attached to the shaft 93 of the cutter-mechanism, as shown in Figs. 1, 2 and 3, thus causing it to have forward and rearward movements with the cutter-parts.

152 designates a trough or pan which is disposed in position to receive the wire sections as they drop from the tubes 124. When the slot 128 is opened by a turning of the slot 130 in the outer tube 129 in register therewith the forward end of a wire section which is disposed within the tube 124 drops down into the pan 152, while the rear end of such section still remains in the rear portion of the tube 124, thus making it necessary to provide some means for drawing the section forward out of the tube. This may be accomplished by mounting the pan 152 on rollers for longitudinal movement on supporting-tracks 153 and connecting an arm 154 on its bottom to an arm 155 on the shaft 93 by a rod 156, thus causing the pan to be moved forward the requisite distance at each rearward movement of the cutter-parts. As the forward end of the wire section lowers it rests on the upper serrated edge of a plate 157, which is disposed transversely of the forward end of the pan, as shown in Fig. 21, thus providing means which engages the crimps in the section and causes it to be drawn forward with the pan until its rear end moves out of the tube 124.

The operation of the machine is as follows:—The wire threads $a$, which are drawn into the machine partially by the action of the crimper rolls 52 and 53 and the action of the rolls 34 and 37, first pass between the sets of rolls 34, 37 by which they are straightened and then pass between the crimping-rolls by which they are crimped as shown. After leaving the crimping-rolls the wires are forced thereby through the alining-blocks 59, which act thereon to take the bow out of the wires, which was occasioned by the crimping-rolls, as otherwise the wires would bow either upward or downward on leaving the crimping-rolls. The wires now feed through the eyes 82 in the hammers 78 and the registering notches 71 and 76 in the stationary and movable knives 69 and 75, respectively, thence through the openings 77 in the block 70, and finally through the mouth-pieces 122 and tubes 124 of the delivery conduits. On each forward oscillatory movement of the cutter-mechanism the knife-bar 72 and its attached knife 75 have wire-cutting movements imparted thereto by reason of the roller 105 traveling in the cam-groove 107 in the cam-bar 108, which bar is held rigid by the locking engagement of the lock-finger 112 therewith. This finger is released from locking engagement with the cam-bar 108 at the limit of forward movement of the cutter-parts, due to the knife-bar 72 contacting therewith, thus permitting the cam-bar to have free oscillatory movements on the rearward movement of the cutter-parts to prevent a cutting movement of the knife-bar 72 during such rearward movement. As the cutter-parts move forward the shaft 99 is rocked by the action of the links 100, 102, thus working the pawl 104 to effect a partial rotation of the coacting ratchet-wheel 88 and a consequent partial movement of the pin-roll 84, which movement, if it is desired to sever a section of wire from one of the series of threads $a$ at each forward movement of the cutter-parts, is sufficient to move one of the pins 85 thereon into engagement with a registering hammer 78, thus elevating a different hammer 78 at each impulse of the actuating pawl 104. The elevating of a hammer 78 is so timed relative to the cutting movement of the upper knife 75 that a wire carried thereby is moved up into the path of movement of the associated cutting edge of such knife just prior to the cutting movement thereof. It will thus be seen that the wires cannot be severed until raised out of the clearance spaces in the bottoms of the notches 71 in the lower knife. As the pins 85 are arranged spirally around the roll 84 it is apparent that the several hammers 78 of the set will be successively acted on at successive forward movements of the cutting parts, thus causing a section to be severed from one of the wire threads during each of such forward movements. As the feed of the wires is continuous the successive severing of their forward ends at successive operations of the cutter-parts will cause the forward ends of the wires to project unequal distances from the knives, or in other words, the ends of the successive wires are disposed a distance apart equal to the length of the forward and rearward stroke of the cutter-parts. The forward movements of the cutter-mechanism are timed to equal the feeding movements of the wires, thus causing the knives to move with the wires during the cutting operation to prevent a buckling of the wires or an interruption of their feed during such operation. At the limit of each rearward movement of the cutter-parts a rearward movement is imparted to the rods 145 and 146, thus effecting a partial rotation of the shaft 135 due to the engagement of the pawl 141 with the ratchet-wheel 140. As the shaft 135 is rotated, the cam-projection 136$^a$ on the disk 136, which is associated with the tube 124 into which the next wire to be severed is feeding, is moved into engagement with the lug 137 on the bottom of the block 127 carried by said tube, thus effecting an elevation of said block. The raising of the block 127 throws the pinion 131 carried by the associated outer tube 129 into mesh with the superimposed rack-bar 132, which bar is moved simultaneously therewith by a movement of the cam-bar 150 in the cam-groove 149 in which the roll 148 at the end of the rack-bar travels, which movement of the cam-bar takes place on the forward movement of the cutter-parts. The movement imparted to the rack-bar 132 is sufficient to give the outer tube 129 one-half of a revolution to move its slot 130 in register with the bottom slot 128 in the inner tube 124 to permit a discharge of the wire section therefrom. At the limit of the forward movement of the cutter-parts the shaft 135 is again actuated to move the disk thereon whereby to permit a lowering of the elevated block 127 to prevent a closing of the conduit slot on the subsequent rearward movement of the cutter-parts. The forward end of the severed section having dropped into the trough 152, it is engaged by the serrated edge of the plate 157 and on the forward movement of said trough on its track, which movement is communicated thereto from the arm 155 on the shaft 93 during the rearward movement of the cutter-parts, is drawn forward so as to free its rear end from the tube 124. The section having been withdrawn from the delivery tube, the outer-tube 129 is given a half rotation to close the delivery slot 128 due to the elevation of the associated block 127 at either the next or one of the subsequent forward movements of the cutter-parts which communicates movement to the rack-bar. The closing of the delivery-tube is regulated by the position of the cam projection 136$^b$ on the associated disk 136, as the projection 136$^a$ elevates the block 127 for the purpose of opening the tube while the projection 136$^b$ elevates it for the purpose of closing the tube. It is apparent that the operations just described in connection with one wire are successively repeated in proper order for the other wires.

I desire it to be understood that my invention is not limited to any specific form or arrangement of the parts except in so far as such limitations are specified in the claims.

Having thus described my invention, what I claim as new and desire to secure by Letters Patent, is,—

1. In combination, continuous wire feeding means, wire cutting mechanism having reciprocatory movements longitudinally of the feed of the wire, and operative at predetermined points in such movements to sever a wire, means for guiding the feed of a wire and normally holding the same out of cutting position, and means for intermittently moving said guide means laterally of the wire feed to move the wire into cutting position.

2. In combination, a reciprocatory frame, shearing parts carried by the frame, means for reciprocating the frame, a cam-member coacting with one of said parts to impart shearing movements thereto when the frame is reciprocated, and means controlled by the movements of the frame for locking the cam-member in rigid operative position during the movement of the frame in one direction and permitting it to move during the movement of the frame in the other direction whereby the shearing-parts are relatively moved during the movement of the frame in one direction only.

3. In combination, continuous wire feeding means, wire cutting mechanism reciprocally movable longitudinally of the feed of the wire, cam means operative to intermittently impart relative shearing movements to the cutting parts of such mechanism, and mechanism operative to intermittently move the feeding wire laterally into position to be severed by the cutting mechanism.

4. In combination, means for continuously feeding a plurality of wires, wire cutting means, means for intermittently actuating said cutting means, a plurality of relatively movable wire guides normally holding the wires out of cutting position, and means for moving the guides to successively place the different wires in position to be severed.

5. In combination, a pair of shearing-parts, wire-carrying members movable transversely of said parts, means for feeding wires through said members, means for successively moving different of said members to place the wires carried thereby in position to be severed by the shearing-parts, and means for imparting relative shearing movements to said parts.

6. In combination, a reciprocatory frame, shearing-parts carried thereby, a plurality of wire-carrying members movable transversely of said parts, said members normally maintaining the wires out of position to be severed by the shearing-parts, means for moving the frame, means for relatively moving the shearing-parts when the frame is moved, and means for successively moving said members to place their wires in position to be severed by the shearing-parts and to lower them from such position when severed.

7. In combination, a reciprocatory frame, shear-parts carried by the frame, means for feeding a plurality of wires to said parts, means for relatively moving said parts at predetermined points in the movement of the frame, a movable member associated with each wire and normally maintaining the wire out of cutting position, and means for successively moving said members during the movements of the frame to place the wires in position to be severed.

8. In combination, a reciprocatory frame, shear-parts carried by the frame, means for reciprocating the frame, means for working the shearing-parts during the movements of the frame in one direction, means for feeding a plurality of wires through the frame, and means for successively moving the wires into position to be severed by the shear-parts.

9. In combination, a reciprocatory frame, shear-parts carried by the frame, means for reciprocating the frame, means for relatively moving the shear parts during a reciprocation of the frame, means for feeding a plurality of wires through the frame, a plurality of members movably carried by the frame and through which the wires pass, and rotary means intermittently actuated during the reciprocatory movements of the frame to effect successive movements of said members to move their wires into position to be severed by the shear-parts.

10. In combination, two knives capable of relative longitudinal shearing movements and having registering notches in the shearing portions thereof, means for feeding wires through such registering notches, means for normally guiding the wires through the notches of only one knife and intermittently movable to direct the wires into cutting position within the registering notches, and mechanism for imparting relative shearing movements to the knives.

11. In combination, a reciprocatory frame, a relatively fixed and a relatively movable knife carried by the frame, said knives having coöperating shearing-teeth, the teeth of one knife only partially lapping the teeth of the other knife to form a clearance space for wires fed therethrough, means for reciprocating the frame, means for acting on the movable knife to move it during the movements of the frame in one direction, a member associated with each wire fed to the knives to normally retain it in the clearance space therein, and means for intermittently moving said members to successively move the wires carried thereby into position to be severed by the knives.

12. In combination, a reciprocatory frame, a fixed knife and a movable knife carried by the frame, means for reciprocating the frame, an oscillatory bar having a cam-groove therein, a roller carried by the movable knife and working in said cam-groove to reciprocate the knife when the bar is fixed, and means controlled by the movements of the frame for locking the bar in fixed position during one direction of movement of the frame and releasing it to permit it to oscillate during the movement of the frame in the other direction.

13. In combination, a reciprocatory frame, shear-parts carried by said frame and relatively movable transversely of the movement of the frame, means for reciprocating the frame, means for imparting relative shearing movements to said parts, and means for opposing the shearing movements of said parts.

14. In a machine of the class described, a wire straightener comprising a pivotally mounted member having an elongated opening therethrough for the passage of a wire to be straightened, and means for adjusting the inclination of said member relative to both a horizontal and a vertical plane.

15. In a machine of the class described, in combination a wire severing mechanism, a delivery conduit through which the severed sections pass, said conduit having inner and outer relatively rotatable parts each having delivery slots which are moved into register by a relative turning of the parts, and means for intermittently rotating one of said parts relative to the other to successively open and close the discharge opening in the conduit.

16. In combination, a reciprocatory wire-cutting mechanism, a delivery conduit associated therewith and having relatively rotatable parts, one inclosing the other and each provided with a longitudinal slot, and mechanism actuated by movements of the cutting-mechanism to relatively move said parts to place said slots into and out of register.

17. In combination, a cutting-mechanism capable of reciprocatory movements longitudinally of the direction of feed of a wire thereto, wire-delivery conduits leading from said mechanism and each having a discharge opening, a member associated with said conduit and movable to open or close said opening, and means actuated by movements of the cutting mechanism to move said member to open and close the conduit opening at predetermined points in a movement of the cutting-mechanism.

18. In combination, a cutting-mechanism capable of reciprocatory movements, a delivery conduit having a relatively movable mouth-piece attached to said mechanism and movable therewith, said conduit having its forward end portion provided with a slot, a tube movably incasing the slotted portion of the conduit and having a slot, a pinion on said tube, a rack-bar disposed adjacent the pinion, and means actuated by a movement of said mechanism for intermittently moving the conduit to cause the pinion to mesh with the rack, and means for reciprocating the rack to turn the pinion and attached tube for the purpose of moving the slot therein into or out of register with the slot in the conduit.

19. In combination, a reciprocatory cutting-mechanism having a plurality of wires fed therethrough, means for cutting different of said wires at successive movements of said mechanism in one direction, a delivery conduit for each wire fed to said mechanism, said conduits comprising relatively movable parts having slots provided therein and adapted to be placed into or out of register when said parts are relatively moved, and mechanism for successively moving the several conduits to discharge their respective wire sections when severed by the cutting-mechanism.

20. In combination, a wire-cutting mechanism capable of reciprocatory movements longitudinally of the feed of wires thereto, means for successively severing sections from different of a plurality of wires fed to the mechanism, a conduit for delivering the severed sections from in advance of the cutting-mechanism, and means for withdrawing the severed sections from the conduit.

In testimony whereof I have hereunto signed my name to this specification in the presence of two subscribing witnesses.

OLIN W. BENSTER.

Witnesses:
C. W. OWEN,
CORNELL SCHREIBER.